United States Patent
Kim (10) Patent No.: US 7,423,998 B2
(45) Date of Patent: Sep. 9, 2008

(54) METHOD AND APPARATUS FOR MANAGING INTERNET PROTOCOL USING NETWORK ADDRESS TRANSLATION IN MOBILE NETWORK

(75) Inventor: Pyung-soo Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1429 days.

(21) Appl. No.: 10/316,179

(22) Filed: Dec. 11, 2002

(65) Prior Publication Data

US 2003/0193921 A1    Oct. 16, 2003

(30) Foreign Application Priority Data

Apr. 13, 2002    (KR) .................... 10-2002-0020240

(51) Int. Cl.
 H04Q 7/24    (2006.01)
(52) U.S. Cl. .................. 370/338; 370/349; 370/389; 370/395.52; 370/471; 370/400; 370/401; 709/230; 709/245; 455/435.1; 455/433
(58) Field of Classification Search ............... 370/338, 370/331, 349, 400, 401, 465, 389, 395.22, 370/435.1
See application file for complete search history.

(56) References Cited

U.S. PATENT DOCUMENTS

| | | | |
|---|---|---|---|
| 6,487,605 B1 * | 11/2002 | Leung | 709/245 |
| 6,501,767 B1 * | 12/2002 | Inoue et al. | 370/465 |
| 6,687,252 B1 * | 2/2004 | Bertrand et al. | 370/401 |
| 6,697,354 B1 * | 2/2004 | Borella et al. | 370/352 |
| 6,741,575 B1 * | 5/2004 | Zhang et al. | 370/329 |
| 6,839,338 B1 * | 1/2005 | Amara et al. | 370/338 |
| 6,847,633 B1 * | 1/2005 | Ryu et al. | 370/352 |
| 6,894,994 B1 * | 5/2005 | Grob et al. | 370/335 |
| 7,031,275 B1 * | 4/2006 | Borella et al. | 370/328 |
| 7,082,118 B1 * | 7/2006 | Sethi | 370/349 |
| 7,305,480 B2 * | 12/2007 | Oishi et al. | 709/230 |

FOREIGN PATENT DOCUMENTS

WO    WO 00/76234 A1    12/2000

* cited by examiner

*Primary Examiner*—Marceau Milord
(74) *Attorney, Agent, or Firm*—Sughrue Mion, PLLC

(57) ABSTRACT

A method and apparatus for managing a mobile Internet protocol (IP) using network address translation (NAT) in a mobile network are provided. The method includes periodically receiving an agent information message from an agent on a network, and checking a connection to a home network or a foreign network. If a connection to the home network is determined based on the agent information message, a global IP address received from the agent of the home network and local IP addresses set a plurality of hosts included in the mobile network are registered, and communication with the home network is performed through conversion between the registered global IP address and each of the registered local IP addresses. If a connection to the foreign network is determined based on the agent information message, a temporary IP address is received from the agent of the foreign network. The temporary IP address is registered with the local IP addresses set at the hosts, and communication with the foreign network is performed through conversions between the registered temporary IP address and each of the registered local IP addresses.

11 Claims, 9 Drawing Sheets

METHOD AND APPARATUS FOR MANAGING INTERNET PROTOCOL USING NETWORK ADDRESS TRANSLATION IN MOBILE NETWORK

CROSS-REFERENCE TO RELATED APPLICATIONS

This application claims the priority of Korean Patent Application No. 02-20240, filed Apr. 13, 2002, which is incorporated herein in its entirety by reference.

BACKGROUND OF THE INVENTION

1. Field of the Invention

The present invention relates to a mobile Internet protocol (IP) service, and more particularly, to a method and apparatus for managing a mobile IP using network address translation (NAT) in a mobile network.

2. Description of the Related Art

Generally, a mobile IP service allows a terminal, after being moved, to have the same IP address that it had before moving.

Figure 1A:
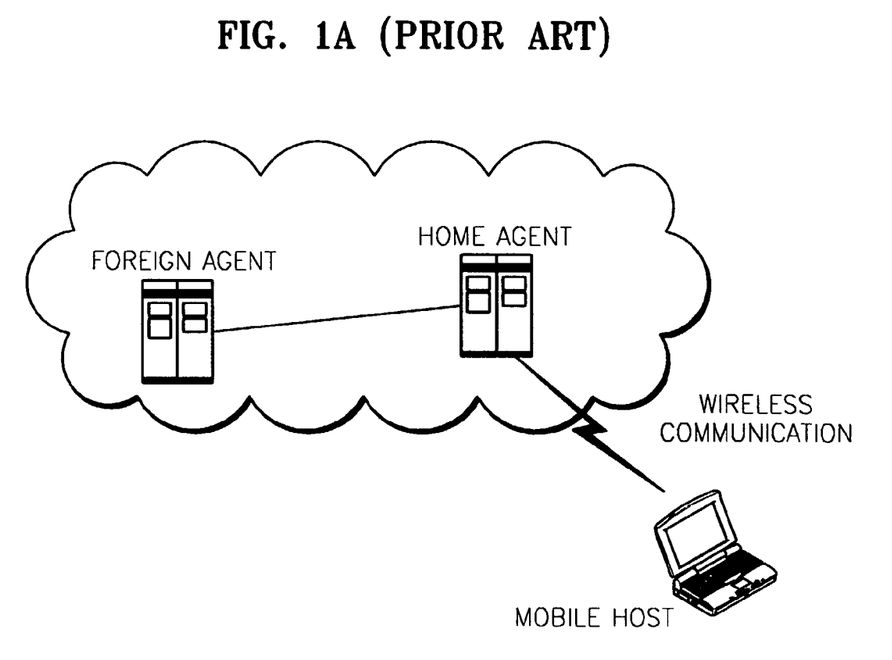
FIGS. 1A and 1B are diagrams showing a conventional network in which a mobile IP is managed.
Figure 1B:
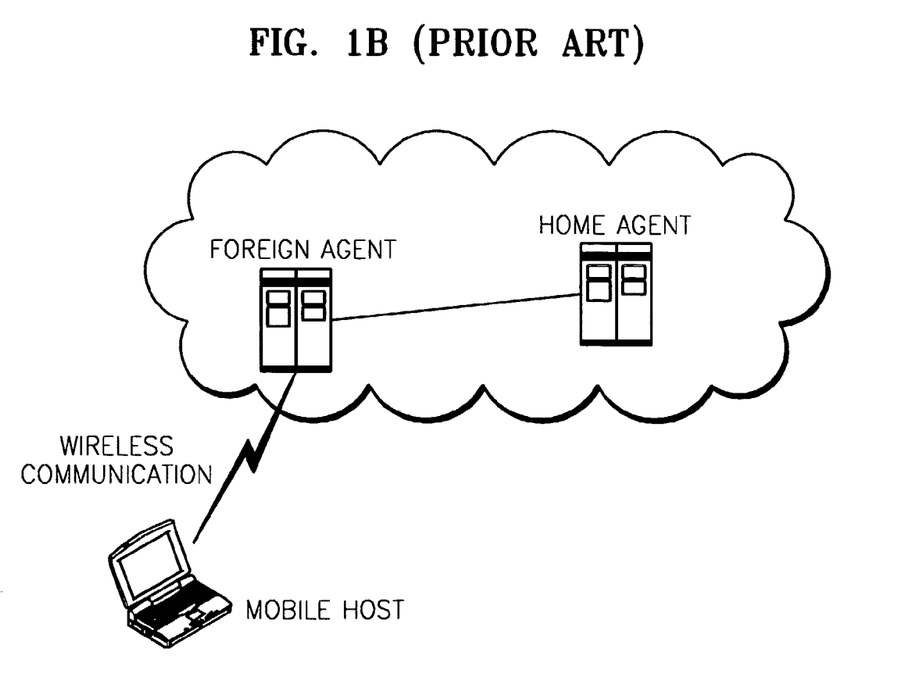

As shown in FIG. 1A, a mobile host is allocated a unique IP address by a home agent in a home network. As shown in FIG. 1B, when the mobile host moves to a foreign network, it can access the Internet without changing its unique IP address. Here, the mobile host cannot access the Internet using an IP address that is allocated in one network in another network (or foreign network). In this case, a foreign agent in the foreign network allocates the mobile host a temporary address referred to as a care-of address (COA), so that the mobile host can communicate with the foreign network. Accordingly, a conventional mobile IP service provides an Internet service for only when a single host (for example, a cellular phone or a notebook) moves.

In the meantime, passengers in an airplane, ship, or train may want to use the Internet while seated. Here, the seats form a network, which is referred to as a mobile network. In order to accomplish a mobile IP for each host connected to the mobile network, a home agent, a foreign agent, and a host are required. However, conventionally, since all hosts at the individual seats connected to the mobile network are allocated an IP address, the network is inefficient in using and managing IP addresses, and also some IP addresses are wasted.

SUMMARY OF THE INVENTION

To solve the above-described problems, it is a first object of the present invention to provide a method for managing a mobile Internet protocol (IP) to accomplish a mobile IP for a mobile network having a plurality of hosts and save IP addresses using network address translation (NAT).

It is a second object of the present invention to provide an apparatus for managing a mobile IP to accomplish a mobile IP for a mobile network having a plurality of hosts.

To achieve the first object and other objects of the present invention, a method for managing a mobile IP in a mobile network having a plurality of hosts includes the steps of: (a) periodically receiving an agent information message from an agent on a network, and checking a connection to a home network or a foreign network; (b) if a connection to the home network is determined based on the agent information message received in step (a), registering a global IP address received from the agent of the home network and local IP addresses set at the hosts, and communicating with the home network through conversion between the registered global IP address and each of the registered local IP addresses; and (c) if a connection to the foreign network is determined based on the agent information message received in step (a), receiving a temporary IP address from the agent of the foreign network, registering it with the local IP addresses set at the hosts, and communicating with the foreign network through conversion between the registered temporary IP address and each of the registered local IP addresses.

To achieve the second object and other objects of the present invention, an apparatus for managing a mobile IP in a mobile network having a plurality of hosts includes a table unit for storing IP addresses; a NAT unit for performing conversion between a global IP address and each of local IP addresses set at the hosts with reference to the IP addresses stored in the table unit; and a controller for periodically receiving an agent information message from one of agents in a network, registering the global IP address received from the agent and each of the local IP addresses in the table unit, and connecting each of the hosts to a remote host based on the result of the conversion performed by the NAT unit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, embodiments of the present invention will be described in detail with reference to the attached drawings.

Figure 2A:
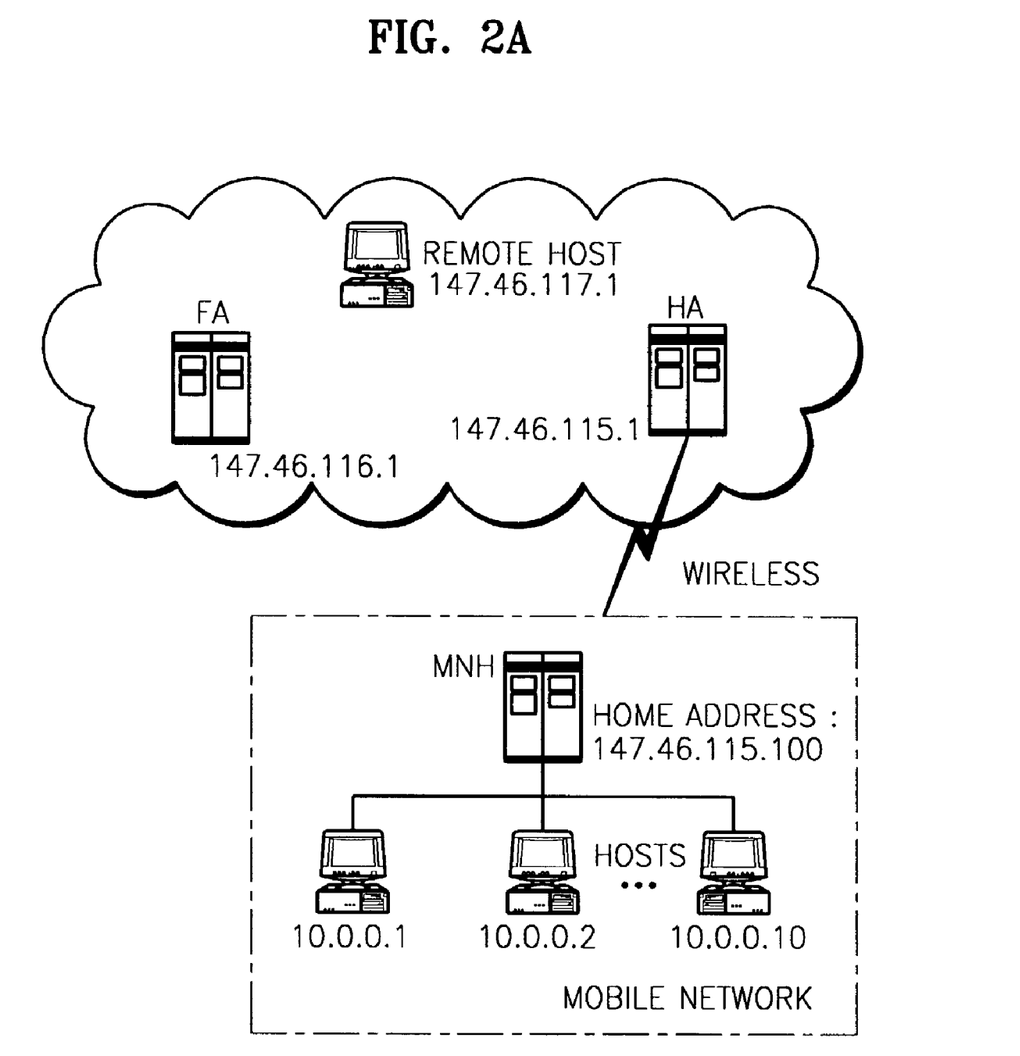
FIGS. 2A and 2B are diagrams showing a network in which a mobile IP is managed according to the present invention.
Figure 2B:
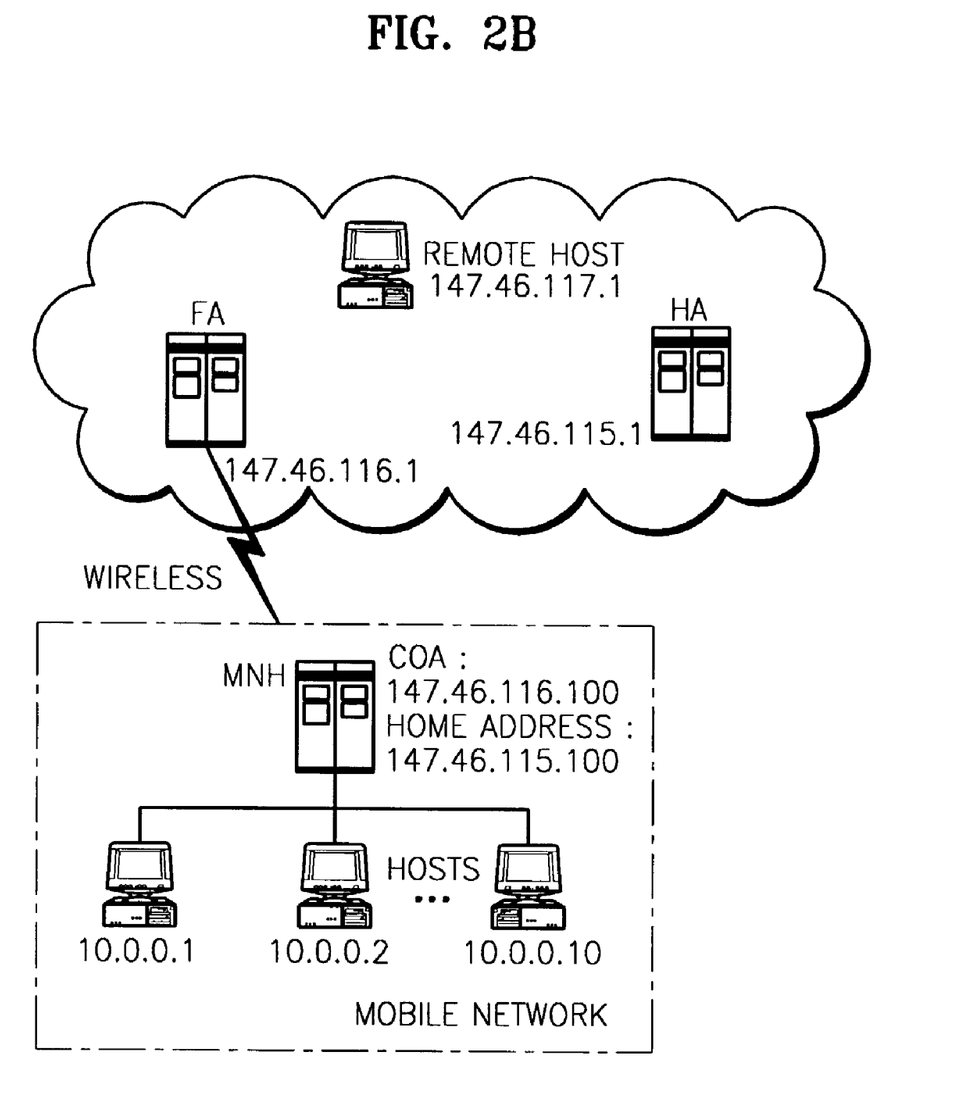

FIGS. 2A and 2B are diagrams showing a network in which a mobile IP is managed according to the present invention. FIG. 2A shows a network in which a mobile network is connected to a home network, while FIG. 2B shows the network in which the mobile network is connected to a foreign network.

Referring to FIGS. 2A and 2B, a plurality of hosts are connected to a representative host, i.e., a mobile network address translator (NAT) host (MNH), thereby forming a mobile network. The MNH may be a router or personal computer (PC) having an NAT function or an NAT device. The MNH manages a plurality of hosts. Whenever the mobile network moves, the MNH is allocated a temporary address, i.e., a care-of address (COA), by a foreign agent (FA) in a foreign network and registers the COA in a home agent (HA)

in a home network through the FA, as shown in FIG. 2B. If the FA is rebooted or if the life time of a registration expires almost immediately, the MNH needs to request the FA to re-register the COA. Here, the MNH needs to keep the link-layer address information of the FA and its COA in order to request to re-register the COA.

The MNA also performs an NAT function, i.e., conversion between a local IP address and a global IP address. The NAT is an address conversion technique that is used to convert a local IP address into a global IP address on the layer 3, referring to the network layer of the Open Systems Interconnection (OSI). The MNH uses the NAT function for the following two purposes. First, the MNH uses the NAT function to convert a local IP address into a global IP address or a global IP address into a local IP address so that a plurality of users can use a single global IP address. Second, the MNH uses the NAT function to install a firewall between the open Internet and a local network so that a user's communication network can be protected from external attacks.

A network with which the mobile network can communicate includes an FA, an HA, and a remote host. When a mobile node disconnects from the home network, the HA transmits packets to the mobile node through an IP channel and maintains and manages the position information of the mobile node. The FA receives the packets from the HA and transmits them to the mobile node.

Figure 3:
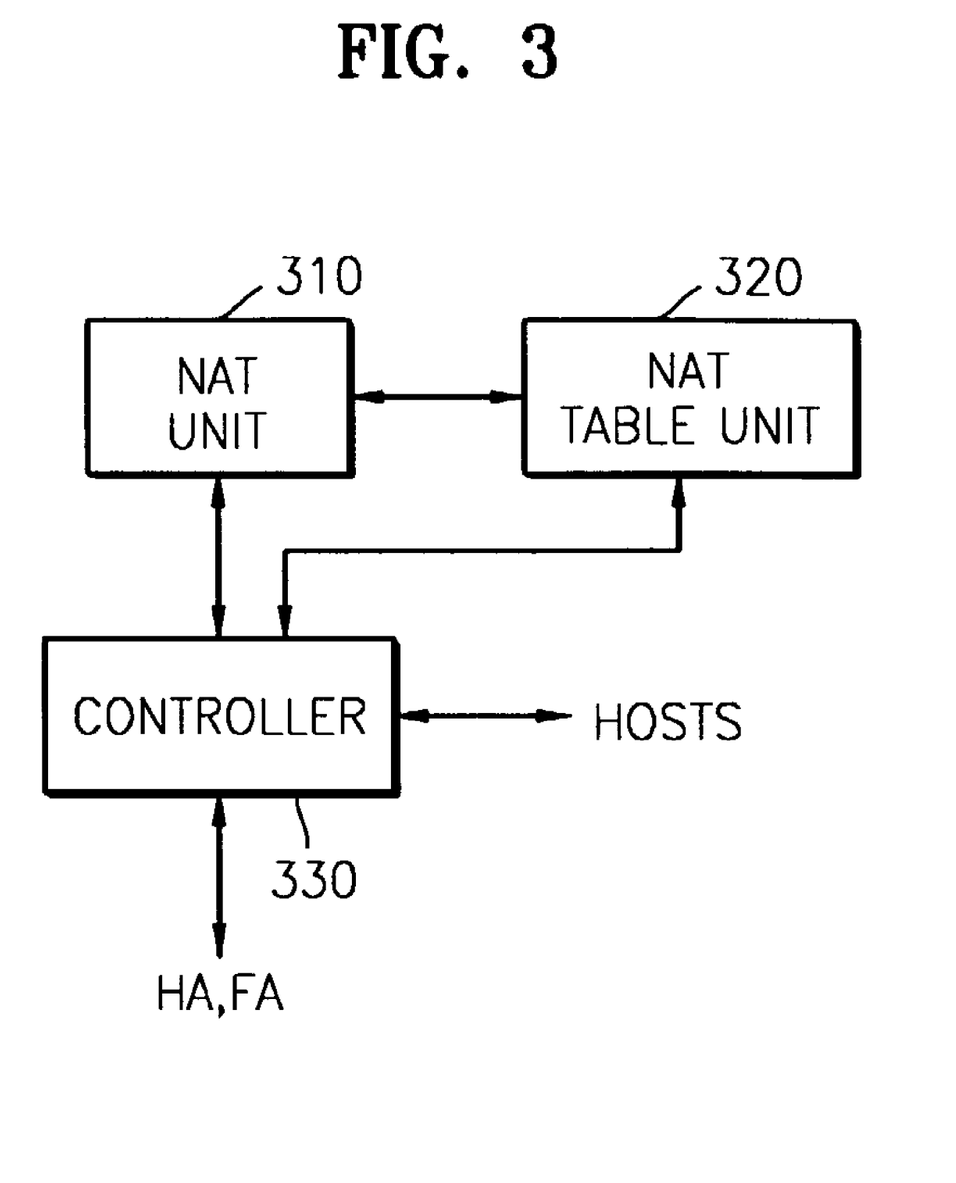
FIG. 3 is a detailed diagram of the mobile network address translation (NAT) host (MNH) shown in FIGS. 2A and 2B, according to an embodiment of the present invention.

FIG. 3 is a detailed diagram of the MNH shown in FIGS. 2A and 2B, according to an embodiment of the present invention. Referring to FIG. 3, a NAT table unit 320 stores a global IP address for NAT, local IP addresses of a plurality of hosts connected to the MNH, and the address of a remote host related to the plurality of hosts. A NAT unit 310 performs conversion between a global IP address and a local IP address, both received through a controller 330.

The controller 330 periodically receives agent advertisement messages from the HA and the FA, checks the connections of the MNH with the home network and the foreign network based on the received agent advertisement messages, registers a global IP address received from the HA and the FA and local IP addresses set at the hosts in the NAT table unit 320, and controls the connection between the plurality of hosts and the remote host using an IP address obtained from the conversion performed by the NAT unit 310.

Figure 4:
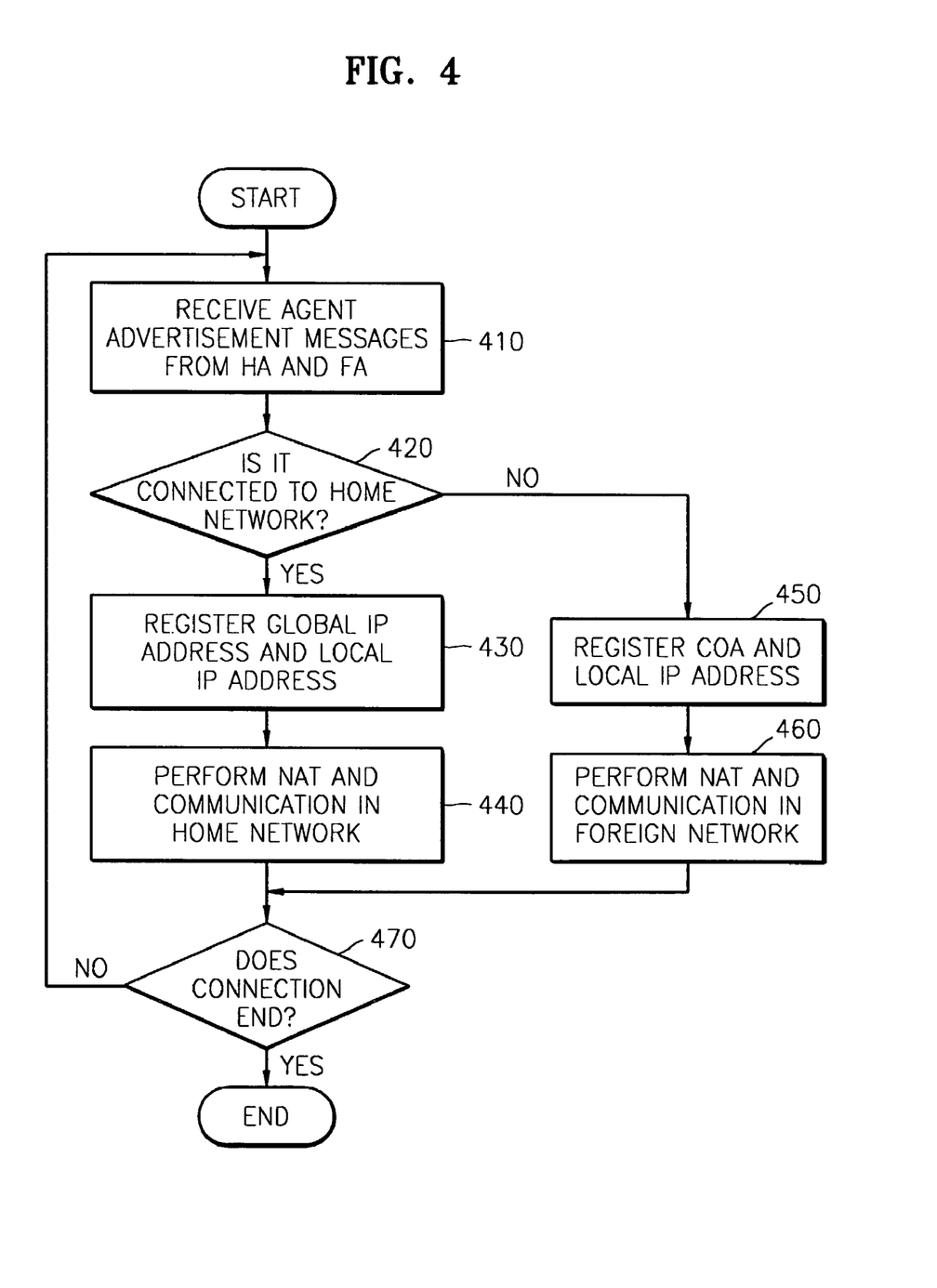
FIG. 4 is a flowchart of a method for managing a mobile IP, which is performed by an MNH, according to an embodiment of the present invention.

FIG. 4 is a flowchart of a method for managing a mobile IP, which is performed by an MNH, according to an embodiment of the present invention. The MNH periodically receives agent advertisement messages from an HA and an FA in step 410, and analyzes prefixes and life times contained in the messages in order to check its connections with a home network and a foreign network in step 420. For example, when the MNH is in the home network, the MNH receives an agent advertisement message which is periodically broadcasted from the HA. The MNH compares a prefix or life time, which is contained in an agent advertisement message that has been received before, with a prefix or life time, which is contained in a new agent advertisement message that is received at a present time. Here, if the MNH receives an agent advertisement message transmitted from the FA, it can recognize that a prefix or life time contained in the message is changed. In other words, the MNH recognizes that its position has moved from the home network to the foreign network.

If the MNH determines that it is connected to the home network based on the agent advertisement messages, as shown in FIG. 2A, the MNH registers a global IP address received from the HA of the home network and a local IP address of each host in step 430, and enables the hosts to communicate with the remote host in the home network through conversion between the local IP addresses and the global IP address in step 440. Here, the global IP address is referred to as a home address.

If the MNH determines that it is connected to the foreign network based on the agent advertisement messages, as shown in FIG. 2B, the MNH registers a COA received from the FA and the local IP addresses of the respective hosts in a NAT table in step 450, and enables the hosts to communicate with the remote host in the foreign network through conversion between the local IP addresses and the COA address in step 460.

Thereafter, the MNH repeats the above steps until it recognizes the end of connection based on an agent advertisement message in step 470.

FIGS. 5 through 8 will be described in detail with reference to the network shown in FIGS. 2A and 2B.

Figure 5:
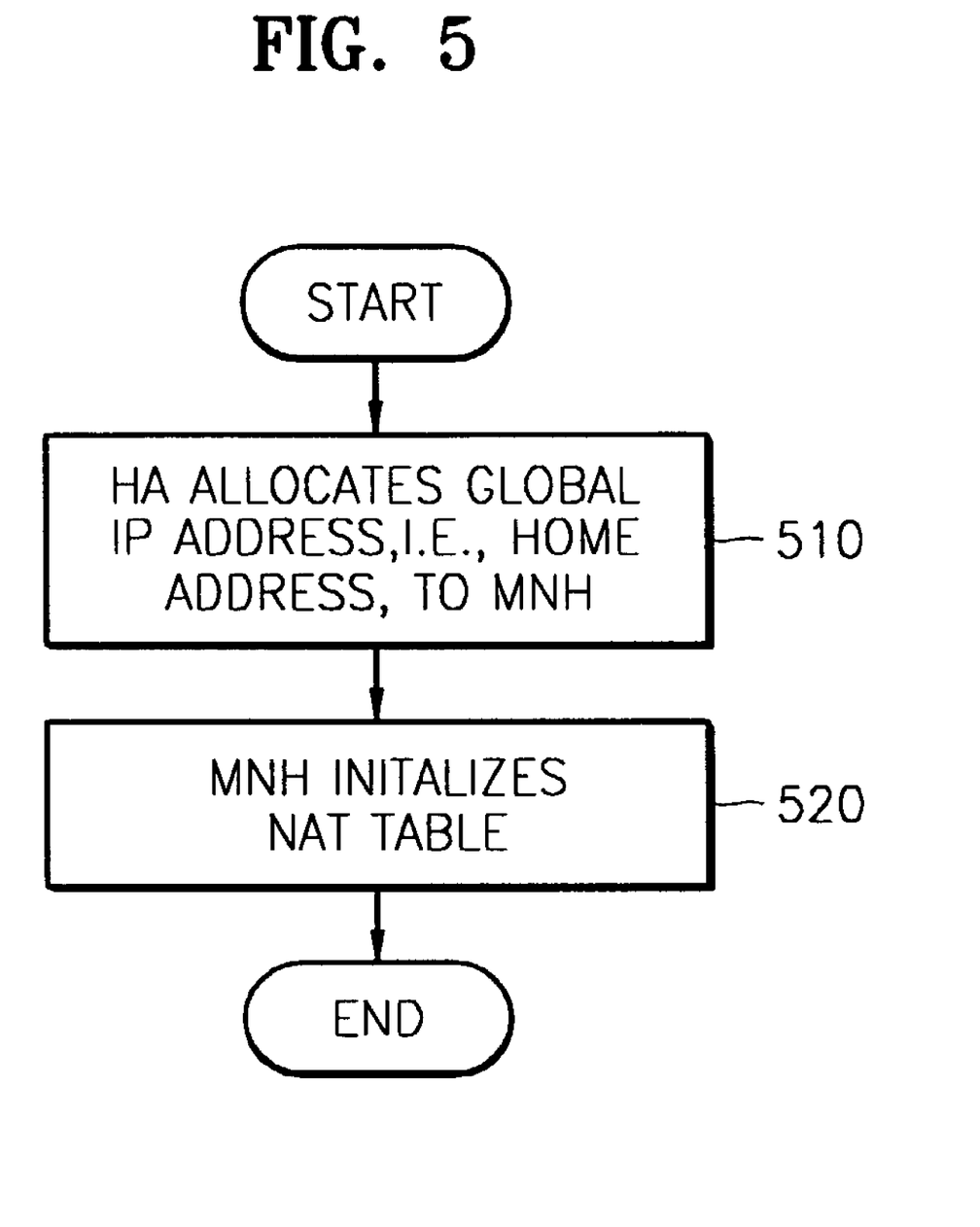
FIG. 5 is a detailed flowchart of the step of registering addresses for home network connection, which is shown in FIG. 4.

FIG. 5 is a detailed flowchart of the step 430 of registering the addresses for home network connection, which is shown in FIG. 4. If the MNH is connected to the home network, the HA having the prefix 147.46.115.1 allocates the global IP address 147.46.115.100 to the MNH in step 510. The global IP address 147.46.115.100 is referred to as a home address and does not change even when the mobile network moves.

Subsequently, the MNH initializes the NAT table using the global IP address 147.46.115.100 in step 520. For example, the home address, i.e., the global IP address 147.46.115.100, the local IP addresses 10.0.0.1 through 10.0.0.10 of the respective hosts managed by the MNH, and the destination addresses of the respective hosts are registered in the NAT table.

The MNH operates such that only the global IP address 147.46.115.100 allocated thereto is open to the outside, but the local IP addresses 10.0.0.1 through 10.0.0.10 are used only within the mobile network.

Figure 6:
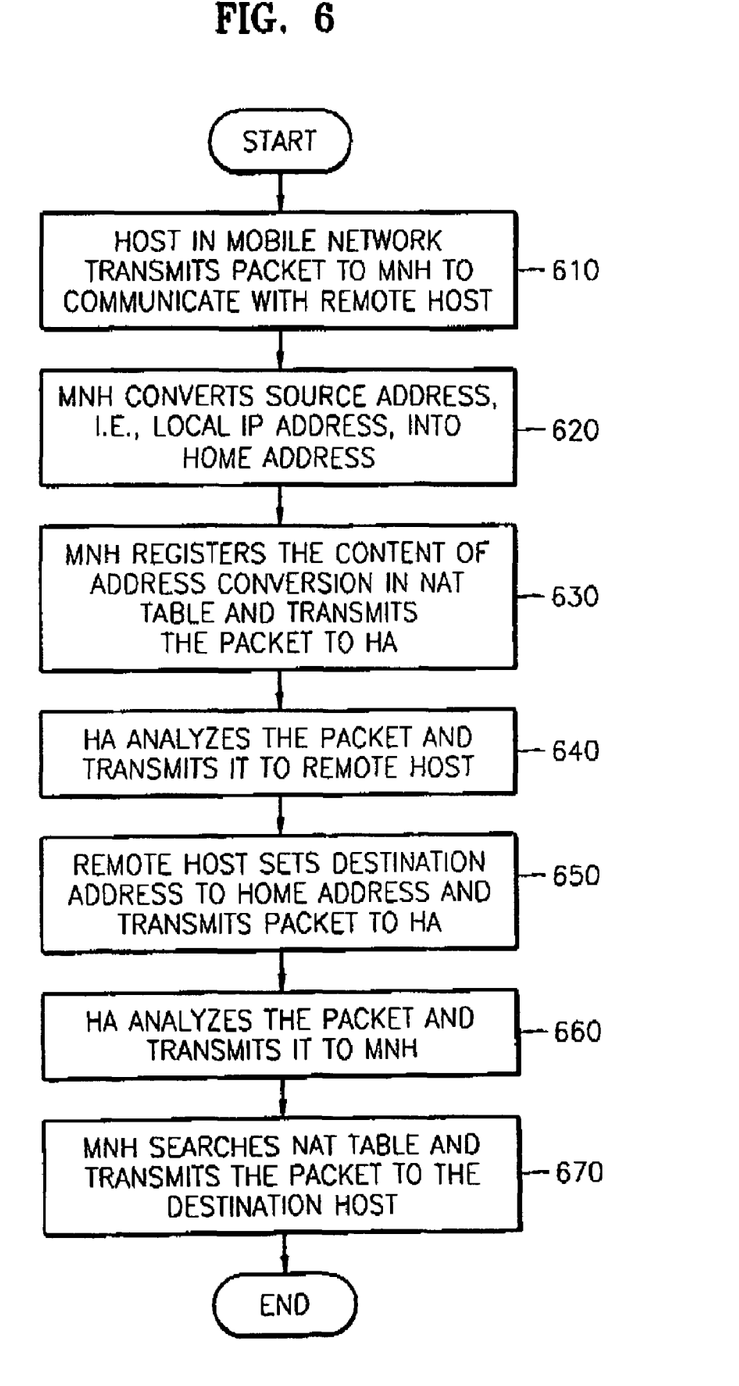
FIG. 6 is a detailed flowchart of the step of performing NAT and communication in the home network shown in FIG. 4.

FIG. 6 is a detailed flowchart of the step 440, shown in FIG. 4, of performing NAT and communication in the home network. A host having the local IP address 10.0.0.1 within the mobile network transmits a data packet to the MNH to communicate with a remote host having the address 147.46.117.1 outside the mobile network in step 610. Then, the MNH converts a source address into its home address before transmitting the data packet to a network including the remote host in step 620. That is, the source address, i.e., the local IP address 10.0.0.1, is converted into the MNH's home address, i.e., the global IP address 147.46.115.100.

Next, the MNH registers the content of the address conversion in the NAT table and transmits the data packet to the HA in step 630. Next, the HA having the address 147.46.115.1 analyzes the data packet received from the MNH and transmits it to the remote host having the address 147.46.117.1 in step 640. Next, the remote host (147.46.117.1) sets a destination address to the home address of the MNH and transmits a packet to the HA (147.46.115.1) in step 650. Next, the HA (147.46.115.1) analyzes the packet received from the remote host (147.46.117.1) and transmits it to the MNH in step 660. Next, the MNH confirms that the source address of the packet is the address of the remote host (147.46.117.1) and transmits it to the destination host (10.0.0.1), which has been registered in the NAT table, within the mobile network in step 670.

Figure 7:
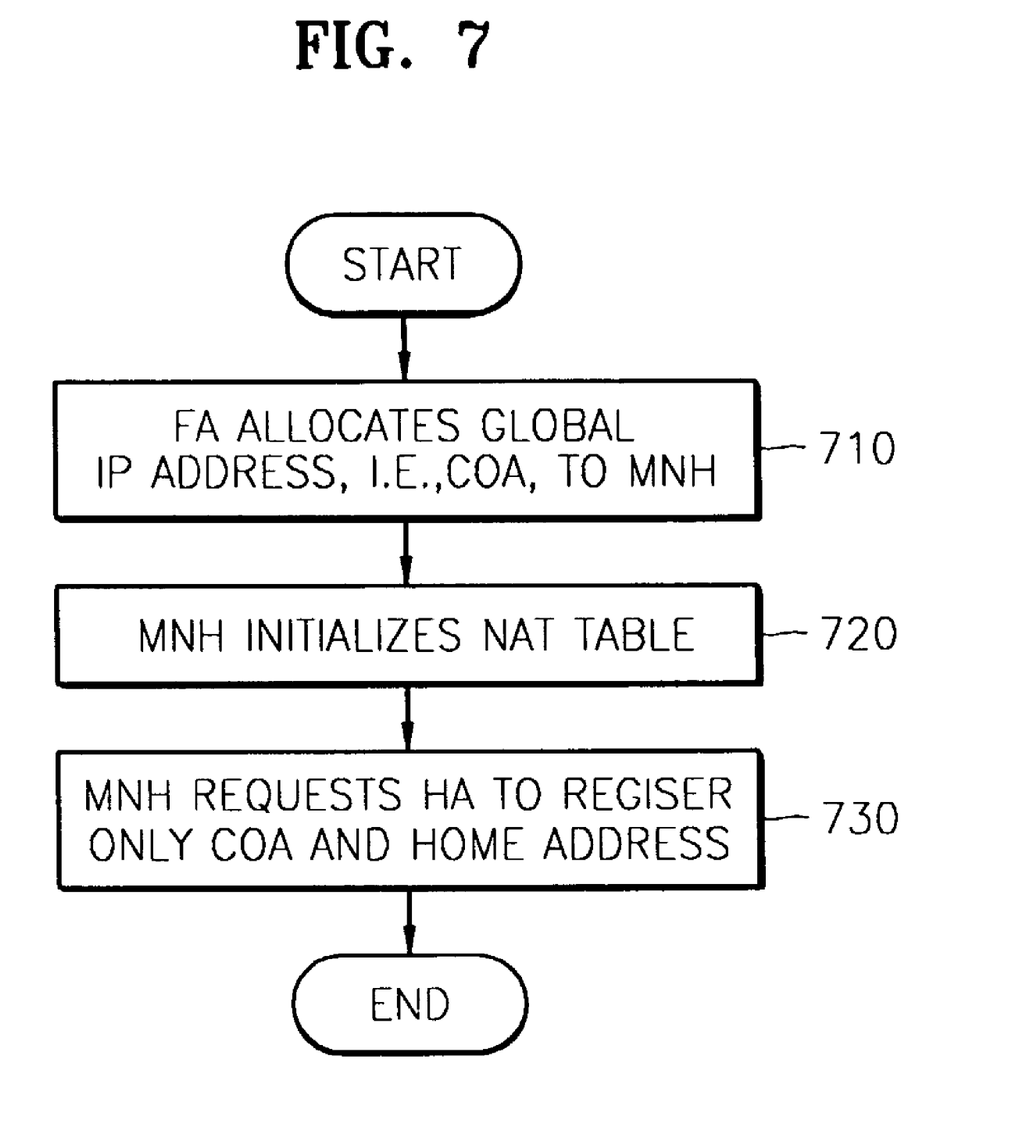
FIG. 7 is a detailed flowchart of the step of registering addresses for foreign network connection, which is shown in FIG. 4.

FIG. 7 is a detailed flowchart of the step 450 of registering the addresses for foreign network connection, which is shown in FIG. 4. If the MNH is connected to the foreign network, the FA having the prefix 147.46.116.1 temporarily allocates the global IP address 147.46.116.100 to the MNH for a predetermined period of time in step 710. The temporary address is referred to as a COA and unlike the home address, changes whenever the mobile network moves.

Subsequently, the MNH initializes the NAT table using the COA 147.46.116.100 in step 720. Here, the hosts managed by the MNH have the same local IP addresses 10.0.0.1 through 10.0.0.10 as those when the mobile network is connected to the home network. In other words, the home address, i.e., the global IP address 147.46.115.100, the COA 147.46.116.100, the local IP addresses 10.0.0.1 through 10.0.0.10 of the respective hosts managed by the MNH, and the destination addresses of the respective hosts are registered in the NAT table.

Next, the MNH requests the HA to register the allocated COA (147.46.116.100) in step 730. Here, registration information contains only the home address and COA, but does not contain the IP addresses of the hosts within the mobile network.

The MNH manages such that only the COA (147.46.116.100) allocated thereto is open to the outside, but the local IP addresses 10.0.0.1 through 10.0.0.10 are used only within the mobile network.

Figure 8:
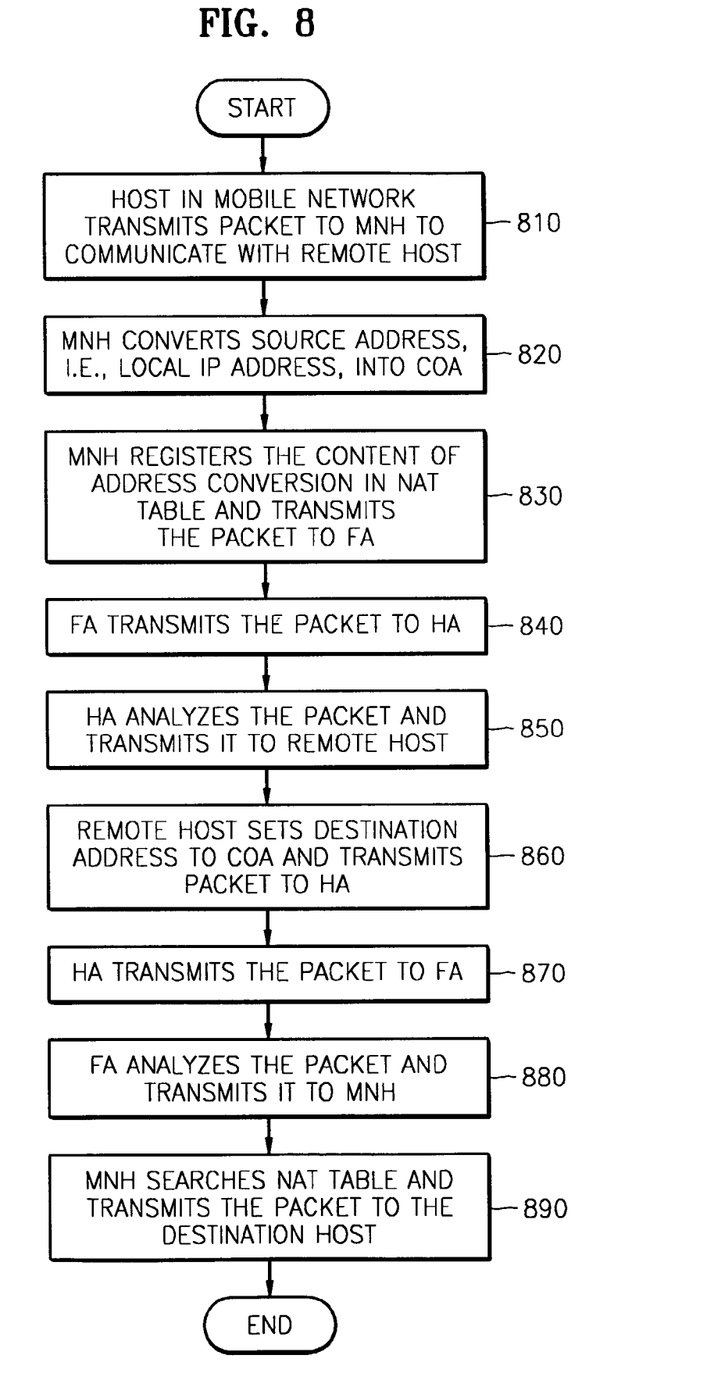
FIG. 8 is a detailed flowchart of the step of performing NAT and communication in the foreign network shown in FIG. 4.

FIG. 8 is a detailed flowchart of the step 460, shown in FIG. 4, of performing NAT and communication in the foreign network. A host having the local IP address 10.0.0.1 within the mobile network transmits a data packet to the MNH to communicate with a remote host having an address 147.46.117.1 outside the mobile network in step 810. Then, the MNH converts a source address, i.e., the local IP address 10.0.0.1, into its COA 147.46.116.100 corresponding to the global IP address before transmitting the data packet to a network including the remote host in step 820.

Next, the MNH registers the content of the address conversion in the NAT table and transmits the data packet and its home address 147.46.115.100 to the FA having the address 147.46.116.1 in step 830. Next, the FA transmits the packet to the HA in step 840. Next, the HA having the address 147.46.115.1 analyzes the data packet received from the FA (147.46.116.1) and transmits it to the remote host (147.46.117.1) in step 850. Next, the remote host (147.46.117.1) sets a destination address to the COA of the MNH and transmits a packet to the HA (147.46.115.1) in step 860. Next, the HA (147.46.115.1) analyzes the packet received from the remote host (147.46.117.1) and transmits it to the FA (147.46.116.1) in step 870. Next the FA analyzes the packet received from the HA (147.46.115.1) and transmits it to the MNH in step 880. Next, the MNH confirms that the source address of the packet is the address of the remote host (147.46.117.1) and transmits it to the destination host (10.0.0.1), which has been registered in the NAT table, within the mobile network in step 890.

The present invention is not restricted to the above-described embodiments, and it will be apparent that various changes can be made by those skilled in the art without departing from the spirit of the invention. For example, when a router or PC instead of a NAT device is used as the MNH, the NAT function can be embodied as either software or hardware.

The present invention can be realized as a code which is recorded on a computer readable recording medium and can be read by a computer. The computer readable recording medium may be any type on which data which can be read by a computer system can be recorded, for example, a ROM, a RAM, a CD-ROM, a magnetic tape, a hard disc, a floppy disc, a flash memory, or an optical data storage device. The present invention can also be realized as carrier waves (for example, transmitted through Internet). Alternatively, computer readable recording media are distributed among computer systems connected through a network so that the present invention can be realized as a code which is stored in the recording media and can be read and executed in the computers.

As described above, the present invention manages a mobile IP using NAT in a mobile network, thereby increasing efficiency in using and managing IP addresses, and preventing waste of IP addresses.

What is claimed is:

1. A method for managing a mobile Internet protocol (IP) in a mobile network comprising a plurality of hosts, the method comprising the steps of:
   (a) periodically receiving an agent information message from one of an agent on a network, and checking a connection to a home network or a foreign network;
   (b) if a connection to the home network is determined based on the agent information message received in step (a), registering a global IP address received from the agent of the home network and local IP addresses set at the hosts, and communicating with the home network through conversion between the registered global IP address and each of the registered local IP addresses; and
   (c) if a connection to the foreign network is determined based on the agent information message received in step (a), receiving a temporary IP address from the agent of the foreign network, registering the temporary IP address with the local IP addresses set at the hosts, and communicating with the foreign network through conversion between the registered temporary IP address and each of the registered local IP addresses.

2. The method of claim 1, wherein the step (a) comprises:
   periodically receiving an agent advertisement message from a home agent or a foreign agent; and
   determining the connection based on a life time state contained in the received agent advertisement message.

3. The method of claim 1, wherein in step (b) the global IP address received from the home agent is registered in a table.

4. The method of claim 1, wherein the step (b) comprises:
   converting a local IP address of a certain host within the mobile network into the global IP address;
   registering the local IP address and the global IP address, which are related to the conversion, in a table and transmitting a packet to a destination host using the global IP address; and
   if a packet is received from the destination host using the global IP address, converting the global IP address into the local IP address of the certain host within the mobile network with reference to the registered addresses in the table.

5. The method of claim 1, wherein in step (c), the global IP address is allocated as a temporary address for a predetermined period of time by the agent of the foreign network, and the allocated temporary address is registered in a table.

6. The method of claim 5, further comprising requesting the agent of the home network to register the allocated temporary address and the global IP address.

7. The method of claim 1, wherein the step (c) comprises:
   converting a local IP address of a certain host within the mobile network into a temporary IP address;
   registering the local IP address and the temporary IP address, which are related to the conversion, in a table and transmitting a packet to a destination host; and
   if a packet is received from the destination host using the temporary IP address, converting the temporary IP address into the local IP address of the certain host within the mobile network with reference to the table.

8. The method of claim 1, wherein the address conversion is performed using a network address translator.

9. An apparatus for managing a mobile Internet protocol (IP) in a mobile network comprising a plurality of hosts, the apparatus comprising:

a table unit for storing IP addresses;

a network address translation (NAT) unit for performing conversions between a global IP address and each of local IP addresses set at the hosts with reference to the IP addresses stored in the table unit; and a controller for periodically receiving an agent information message from one of agents in a network, registering the global IP address received from the agent and each of the local IP addresses in the table unit, and connecting each of the hosts to a remote host based on the result of the conversion performed by the NAT unit.

10. The apparatus of claim 9, wherein the table unit stores the global IP address, the local IP addresses of the hosts, and destination addresses of the respective hosts.

11. A computer-readable recording medium on which a method for managing a mobile Internet protocol (IP) in a mobile network is recorded in the form of codes of software which can be executed on a computer, the mobile network comprising a plurality of hosts and a representative host managing the plurality of hosts, the codes executing:

periodically receiving an agent information message from one of an agent on a network, and checking a connection to a home network or a foreign network;

if a connection to the home network is determined, registering a global IP address received from the agent of the home network and local IP addresses set at the hosts and communicating with the home network through conversion between the registered global IP address and each of the registered local IP addresses; and if a connection to the foreign network is determined, receiving a temporary IP address from the agent of the foreign network, registering the temporary IP address with the local IP addresses set at the hosts, and communicating with the foreign network through conversion between the registered temporary IP address and each of the registered local IP addresses.

\* \* \* \* \*